United States Patent
Tseng

(10) Patent No.: US 8,042,086 B2
(45) Date of Patent: Oct. 18, 2011

(54) METHOD AND APPARATUS FOR VERIFYING INTEGRATED CIRCUIT DESIGN USING A CONSTRAINED RANDOM TEST BENCH

(75) Inventor: Hsien-Chang Richard Tseng, Superior, CO (US)

(73) Assignee: Oracle America, Inc., Redwood City, CA (US)

( * ) Notice: Subject to any disclaimer, the term of this patent is extended or adjusted under 35 U.S.C. 154(b) by 490 days.

(21) Appl. No.: 11/963,386

(22) Filed: Dec. 21, 2007

(65) Prior Publication Data

US 2009/0164861 A1 Jun. 25, 2009

(51) Int. Cl.
*G06F 17/50* (2006.01)
*G01R 31/28* (2006.01)

(52) U.S. Cl. ........ 716/136; 716/106; 714/724; 714/739; 714/741

(58) Field of Classification Search ................. 716/4–5, 716/106, 107, 111, 136; 714/227, 724, 739, 714/741
See application file for complete search history.

(56) References Cited

U.S. PATENT DOCUMENTS

| | | | | |
|---|---|---|---|---|
| 4,984,239 A | * | 1/1991 | Suzuki et al. | 714/703 |
| 5,913,049 A | * | 6/1999 | Shiell et al. | 712/215 |
| 6,490,711 B2 | | 12/2002 | Buckley, Jr. | |
| 6,701,474 B2 | * | 3/2004 | Cooke et al. | 714/724 |
| 2003/0066003 A1 | * | 4/2003 | Parvathala et al. | 714/738 |
| 2005/0060626 A1 | * | 3/2005 | Rajski et al. | 714/728 |
| 2006/0242525 A1 | * | 10/2006 | Hollander et al. | 714/742 |

OTHER PUBLICATIONS

Author Unknown, "Response Capture", http://www.doulos.com/knowhow/verilog_designers_guide/response_capture/, 2 pages, at least as early as Oct. 18, 2007.
Author Unknown, "Test Benches", http://www.doulos.com/knowhow/verilog_designers_guide/test_benches/, 2 pages, at least as early as Oct. 18, 2007.
McGrath, Dylan, "IEEE approves SystemVerilog, revision of Verilog", http://www.eetimes.com/showArticle.jhtml?articleID+173601060, 2 pages, Nov. 9, 2005.

* cited by examiner

*Primary Examiner* — Vuthe Siek
(74) *Attorney, Agent, or Firm* — Polsinelli Shughart PC

(57) ABSTRACT

A constrained random test bench methodology employing an instruction abstraction layer. The instruction abstraction layer includes an instruction streamer for generating random test instruction sequences that preserve instruction order dependencies and randomly selecting data values from a valid range of data values. Multiple instruction streamers may be employed to simulate interrupt handlers and other functional design units sharing a control command bus. A priority scheduler sequences the instruction sequences generated by multiple instruction streamers based on a specified priority scheme.

17 Claims, 7 Drawing Sheets

METHOD AND APPARATUS FOR VERIFYING INTEGRATED CIRCUIT DESIGN USING A CONSTRAINED RANDOM TEST BENCH

FIELD OF THE INVENTION

Aspects of the present invention relate to verification of an integrated circuit design. More particularly, aspects of the present invention relate to a constrained random test bench.

BACKGROUND

During the design of an integrated circuit, a test bench may be used to verify that the design is correct. The test bench may be a simulator that applies stimuli (test vectors) to the inputs of the design and captures responses from the outputs of the design during a simulation. As integrated circuit and application specific integrated circuit (ASIC) designs increase in size and complexity, traditional directed test bench methods to verify the design may be less efficient at finding design errors. A directed test bench generally applies fixed sequences of test vectors to the design under test (DUT) during a simulation. To verify the control path of a DUT, a directed test bench typically is programmed with the exact register access sequence of instructions issued to the DUT via a control command bus.

The register access instruction sequence may vary due to an interrupt routine being started to service an interrupt. Additionally, when multiple functional design units share the same control command bus, the bus traffic may be more complex due to the traffic for various function design units being multiplexed with register access instruction sequences addressed to the DUT. However, generation of all possible test sequences may be a time consuming process when a directed test bench is used. To address some of the shortcomings of a directed test bench, a Constrained Random Test (CRT) test bench may be used. A Constrained Random Test bench architecture may be built on SystemVerilog, a standard language for chip design. SystemVerilog is a unified language for hardware design, specification and verification. SystemVerilog employs register transfer level (RTL) code to describe logic functionality.

What is needed is a constrained random verification methodology focused on the control path of the DUT. What is further needed is an instruction abstraction layer that allows test cases to be created using instructions having a higher level of abstraction. What is also needed is a CRT bench architecture that can randomize valid control oriented test sequences that preserves the validity of the test sequences. What is also needed is a test bench that can randomly insert a noise test sequence and/or an interrupt handling routine into a valid command sequence to test design sensitivity to commands issued outside its address space and/or sensitivity to when an interrupt occurs.

SUMMARY

One aspect of the present invention involves a constrained random test bench for verifying an integrated circuit design. The test bench includes an instruction streamer configured to hold an instruction sequence for verifying a particular mode of operation of an integrated circuit. The test bench further includes a priority scheduler in communication with the instruction streamer. The priority scheduler is operable to issue the instruction sequence one instruction at a time. The test bench finally includes an instruction translator in communication with the priority scheduler. The instruction translator is configured to receive the issued instruction and apply it to the integrated circuit design.

Another aspect of the present invention involves a method for performing a constrained random test to verify a chip design. The method involves receiving an indication of a test to be executed and constructing a plurality of instruction sequences to implement the test. The method further involves executing a first instruction from a first instruction sequence, determining that a second instruction sequence awaiting execution has a higher priority than the first instruction sequence and executing the second instruction sequence after the first instruction completes.

Yet another aspect of the present invention involves a method for performing a constrained random test to verify a chip design. The method involves receiving an indication of a test to be executed and constructing a plurality of instruction sequences. Each instruction sequence includes one or more instructions. The method further involves issuing each instruction sequence to a corresponding instruction queue and executing a first instruction from a first instruction queue. The method finally involves determining that a second instruction queue having a higher priority that the first instruction queue has a second instruction sequence awaiting execution and executing the second instruction sequence after the first instruction completes.

DETAILED DESCRIPTION OF EMBODIMENTS OF THE INVENTION

Figure 1:
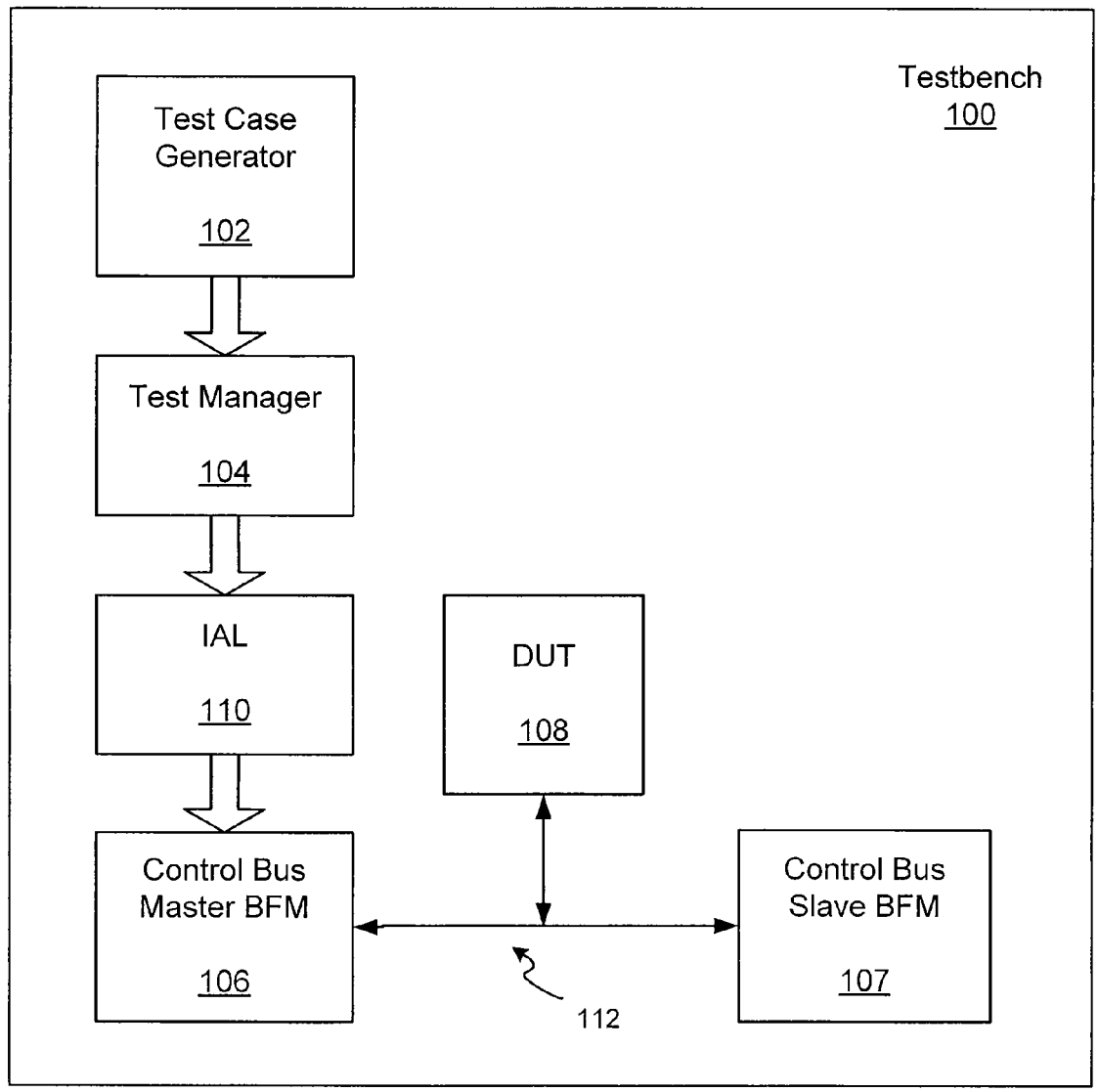
FIG. 1 depicts a constrained random test bench for verifying an integrated circuit design.

During the design of an integrated circuit or ASIC, a CRT test bench 100, as depicted in FIG. 1, may be developed to verify the design. The test bench 100 may apply test cases to a design 108 during a simulation. For each test case, the test bench may apply input stimuli (test vectors) to the design 108 and capture the outputs (responses) from the design 108 via a control command bus 112. Each captured response may be compared with an expected response to determine if the design 108 passed or failed a particular test case.

The test bench 100 may include a test case generator 102 (TCG), a test manager 104 (TM), a control bus master bus functional model (BFM) module 106 and a control bus slave BFM module 107. The control bus master BFM module 106 applies stimuli to the inputs of the design 108 and the control bus slave BFM module 107 during a register write operation. The control bus master BFM module 106 captures responses from the outputs of the design 108 and the control bus slave BFM module 107 during a register read operation. In one embodiment, the control command bus 112 may include an address bus, a data bus and a read/write control signal. Typically, the control bus master BFM module 106 drives the address bus and the read/write control signal. The data bus typically is driven by the control bus master BFM module 106 during a write operation or by the control bus slave BFM module 107 during a read operation.

An exemplary embodiment may include an instruction abstraction layer 110 (IAL). The IAL 110 allows generation of test cases using macro instructions rather than using lower level instructions based on a low level hardware description language (HDL) such as register transfer level (RTL). The IAL typically sends one instruction at a time to the control bus master BFM module 106. Each instruction may include an address value, a data value, and a read/write control signal value. For example, the control bus master BFM module may be instructed to write a data value of 1234 to a register (of the design) at an address location 104. The control bus master BFM module then drives the address bus with an address value of 104, drives the data bus with a data value of 1234 and asserts a logic one (or logic zero if the control line is active low) on the read/write control to indicate a write operation is being performed.

The CRT test bench architecture for a control oriented design may be complex. Generally, in a control oriented design, a particular functional mode of operation of the design to be tested, e.g., a data transform on a block of data, may require initialization of various internal registers. This may require that the test bench apply a sequence of commands to the design to program the internal control registers of the design for the functional mode of operation being tested. Then, while the design processes data, it may be desirable for the test bench to issue commands not addressed to the design's address space to simulate another device sharing the command bus. Additionally, the test bench may have to monitor an internal register of the design to determine when the test completes. This may involve the test bench performing a polling operation by repeatedly reading a status bit in one of the design's internal registers until the bit is set. The test bench may also have to apply a sequence of commands to the design to simulate an interrupt handling routine. Furthermore, upon completion of a test, the test bench typically reads one or more internal registers of the design to verify that the design passed or failed the test.

Thus, a test case for a control oriented design typically involves sending a program sequence of instructions to initialize the design and instruct it to perform a selected operation. A program instruction sequence may include certain instructions that generally have to appear in a specific order (i.e., order dependent instructions) and/or instructions that may appear in a random order (i.e., non-order dependent instructions). It may also be desirable to randomly insert an interrupt service instruction sequence into the program instruction sequence. It may be further desirable to send noise instructions at random times to simulate the presence of another device sharing the control bus with the design during the simulation. Generating all possible test case variations for a constrained random test may become a daunting task.

During verification of a control oriented chip design, a control bus interface of the design typically is verified to determine that a proper bus protocol is followed. Because the control command bus 112 may be shared (e.g., the control command bus may be connected to other integrated circuits), the design is typically tested from a system perspective. This may involve verifying that the design responds to constrained random program instruction sequences appropriately. As discussed in more detail below, the constrained random program instruction sequence typically is a sequence of one or more macro instructions (MIs). Certain MIs of the sequence may be order sensitive while other MIs may not be order sensitive. Further, one or more MIs may include data values that may take on a range of valid values. Additionally, an interrupt handling sequence of instructions may be randomly inserted into a program instruction sequence to simulate the random occurrence of an interrupt. Finally, noise type instructions may be randomly applied to test a design's sensitivity to instructions that should be ignored by the design.

Verifying proper control path operation using a constrained random test bench presents several challenges including: 1) randomizing a valid instruction sequence such that the order of certain order dependent instructions are maintained while non-order dependent instructions are randomized; 2) randomly injecting noise type instructions that lie outside of the address space of the design; 3) injecting an interrupt service routine (ISR) instruction sequence after a random delay to simulate an interrupt handler; 4) injecting a specific instruction sequence at a specific time; 5) managing a polling instruction; 6) prioritizing instruction sequences; and 7) collecting functional coverage for a complex instruction sequence (e.g., verifying a cyclic redundancy check value for an entire memory of the chip design).

The test bench 100 (or verification platform) generally verifies that a DUT 108 responds properly to an instruction sequence that may be randomized within specified constraint boundaries. This may be referred to as constrained random verification of the design control path. One particular embodiment may be based on a VMM and RAL-based SystemVerilog test bench. It is to be appreciated that the invention may be utilized with other test benches. Use of the SystemVerilog test bench is by way of illustration and not limitation.

The IAL 110 generally allows lower level control instructions to be abstracted to higher level MIs and provides more flexibility in creating and executing constrained random tests. In a control oriented design, the design typically expects certain order dependent instructions in a test sequence to be applied in a specific order while being insensitive to the ordering of other instructions within the test sequence. That is, a constrained random test sequence generally has to initialize the design being simulated by applying the proper sequence of control instructions to program a desired function such as a data transform function. The control instructions generally are applied on the control command bus before the desired function (e.g., transfer a block of data and perform a specified transformation on the block of data) is performed by the DUT 108.

The IAL 110 typically automates the process of generating a valid random program instruction sequence. The IAL 110 may also allow other instruction sequences to be injected onto the control command bus during execution of a program instruction sequence. For example, the IAL 110 may inject an interrupt service instruction sequence on the control command bus while a program instruction sequence is being sent to the design to simulate handling an interrupt asynchronously, i.e., after a random time delay from when the interrupt is asserted. The IAL 110 may also inject background noise instructions on the control command bus that lie outside of the address space of the design to test a design's sensitivity to command instructions that should be ignored by the design.

Figure 2:
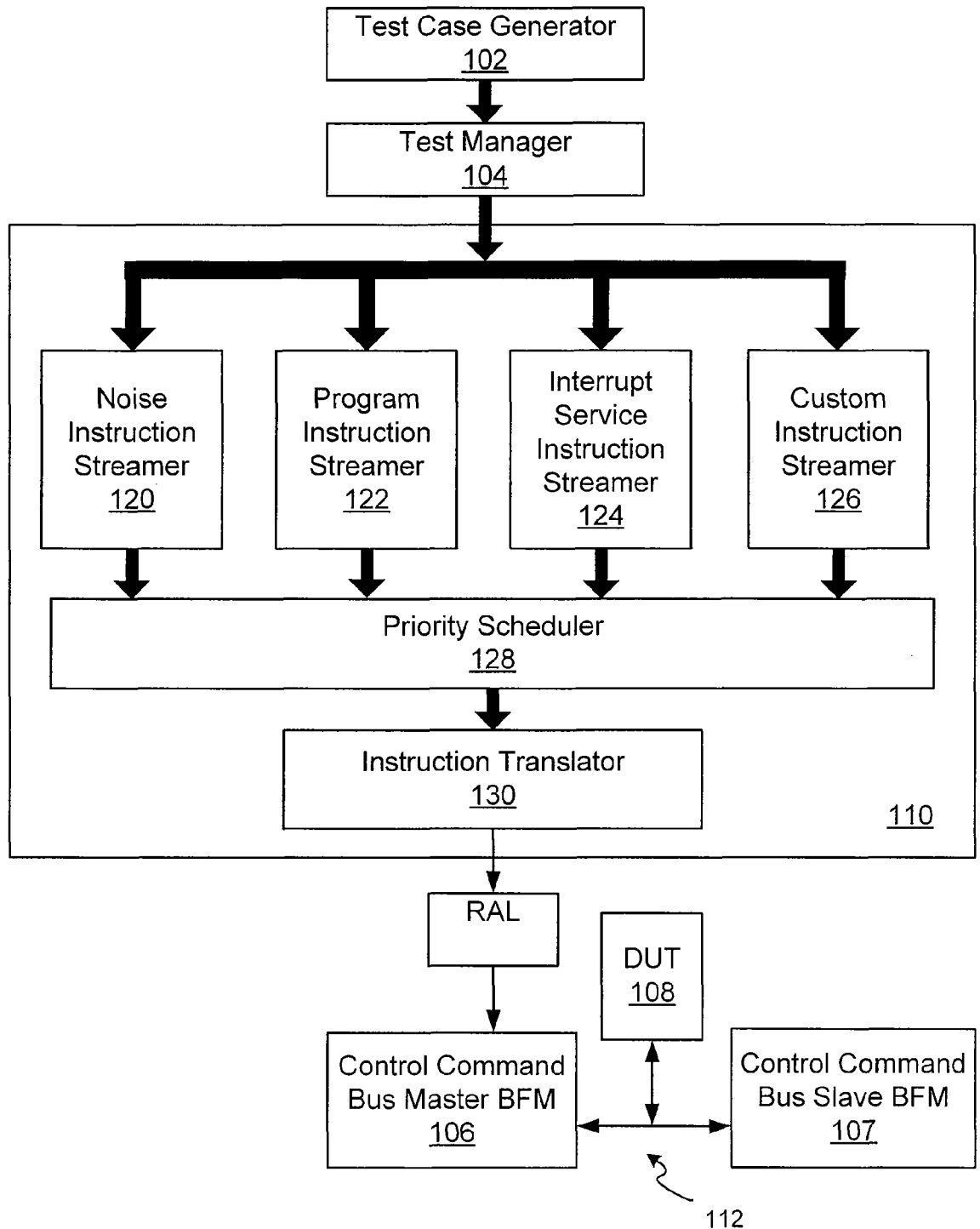
FIG. 2 depicts the instruction abstraction layer of the constrained random test bench of FIG. 1.

In one exemplary embodiment, the IAL 110 may include a noise instruction streamer 120, a program instruction streamer 122, an interrupt service instruction streamer 124, a custom instruction streamer 126, a priority scheduler 128 and an instruction translator 130, as depicted in FIG. 2. Other embodiments may have more or fewer instruction streamers and/or other types of instruction streamers. Each instruction streamer 120,122, 124,126 typically generates instruction streams autonomously and independently. The priority scheduler 128 selects an individual instruction from the instruction streamers based on a priority scheme and sends the selected instruction to the instruction translator 130. The instruction translator 130 translates the selected instruction into one or more low level commands understood by the control bus master BFM module 106.

The test case generator 102 may be used to generate test cases. A test case may include a valid program instruction sequence for verifying a particular instance of a mode of operation of the DUT 108. The test case may further include one or more constraints that indicate valid ranges of data values such as source and destination addresses and/or order dependencies within the sequence of instructions that should be maintained, etc. The test case may further include an interrupt service routine instruction sequence to service an interrupt and may further indicate that noise instructions should be sent to the design when the control command bus 112 is idle.

Test cases may be passed to the test manager 104 for execution. The test manager 104 typically analyzes a test case to select the instruction streamers necessary to execute the test case. The test manager 104 instructs the appropriate instruction streamers 120,122,124, 126 to issue the appropriate instruction streams. In response, each selected instruction streamers 120,122,124,126 generally queue up the appropriate instruction stream based on the test case executed. Each instruction stream may be queued within the particular streamer or alternatively may be queued within the priority scheduler 128. It should be noted that the queuing of certain instruction streams, such as an interrupt service instruction stream may occur in response to certain events such as an interrupt. The test manager may also halt an instruction streamer at any time during execution of a test case depending upon the specific requirements of the test case.

Figure 3:
FIG. 3 depicts a program instruction sequence of a test case.
Figure 4:
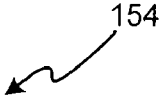
FIG. 4 depicts a constrained random program instruction sequence of the program instruction sequence of FIG. 3 generated by a program instruction streamer.

A test case may include a program instruction sequence of macro instructions (MIs) to be applied to the design 108 by the program instruction streamer 122. FIG. 3 depicts a typical program instruction sequence 140. The program instruction sequence 140 may include an order dependent MI 142 that should be the first instruction in the program sequence (e.g., a reset instruction), another order dependent MI 144 that should be the final instruction (e.g. a go instruction) in the program instruction sequence 140 and order independent MIs 146,148,150, 152 (i.e., instructions which may be sent in any order). The program instruction streamer 122 may apply the program instruction sequence 140 in order, i.e., the instruction sequence may not be randomized in a constrained random fashion. Alternatively, the program instruction streamer 122 may randomize the program instruction sequence 140 to create a constrained random program instruction sequence 154, as depicted in FIG. 4, that maintains the order sensitive relationships of the MIs 142,144 but randomizes the order of the order independent MIs 146, 148, 150, 152. A valid constrained random program instruction sequence 154 may be generated using a constraint to specify which MIs can be randomized, a valid range of values for a data value, etc. A seed may also be specified to allow the same randomized program instruction sequence to be generated by specifying the same seed.

Because a particular test case may specify that a first MI should be applied to the design, that several intermediate MIs may be applied to the design in a random order and that a final MI should then be applied to the design, generating the various possible program instruction sequences by hand may be a time consuming process and may result in incomplete test coverage, i.e., the test cases do not cover all variations of the instructions and/or data values. An exemplary embodiment employs a program instruction streamer to automatically generate valid constrained random test sequences based on a constraint.

Each instruction streamer 120,122,124, 126 of the IAL 110 may have a specified priority such that a higher priority instruction streamer is serviced by the priority scheduler 128 before a lower priority instruction streamer is serviced. In one embodiment, the instruction streamers may be prioritized from highest to lowest priority as follows: custom instruction streamer 126, interrupt service instruction streamer 124, program instruction streamer 122 and noise instruction streamer 120. Other embodiments may prioritize the instruction streamers differently and may also allow the priority of the instruction streamers to change on a test case by test case basis.

Each instruction steamer may translate each MI of the instruction sequence into one or more atomic instructions (AIs) to form an AI instruction sequence. In one exemplary embodiment, each MI represents a fixed sequence of one or more AI instructions. An AI generally is the smallest instruction unit (primitive) managed by the program scheduler. Thus, an AI, when translated by the instruction translator 130, typically is a set of low level instructions (e.g., register level read/write commands) that are applied to the DUT 108 in order without interruption. The priority scheduler 128 generally allows each AI to complete before transferring another AI to the instruction translator for translation and low level execution by the control bus master BFM module 106.

The priority scheduler 128 typically issues an atomic instruction from the highest priority instruction streamer having an instruction queued up and awaiting execution to the instruction translator 130. The priority scheduler 128 then waits for the instruction translator 130 to finish executing the atomic instruction. The priority scheduler 128 then issues an atomic instruction from the highest priority instruction streamer having an atomic instruction awaiting execution. For example, the interrupt service instruction streamer 124 may queue up an interrupt service routine sequence of atomic instructions while a program sequence of atomic instructions from the program instruction streamer 122 is being executed (i.e., partially executed) and the noise instruction streamer 120 may have a sequence of atomic instructions queued up for execution. When the interrupt service instruction streamer priority is higher than the program instruction streamer priority which in turn is higher than the noise instruction streamer priority, the priority scheduler issues the first interrupt service instruction streamer atomic instruction to the instruction translator when the current AI from the program sequence completes execution. The priority scheduler continues to issue atomic instructions from the interrupt service instruction streamer queue until the interrupt service instruction streamer queue is empty. Then, the priority scheduler issues the remaining atomic instructions from the program instruction streamer queue until that queue is empty. Finally, the priority scheduler issues the atomic instructions from the noise instruction streamer queue.

Figure 5:
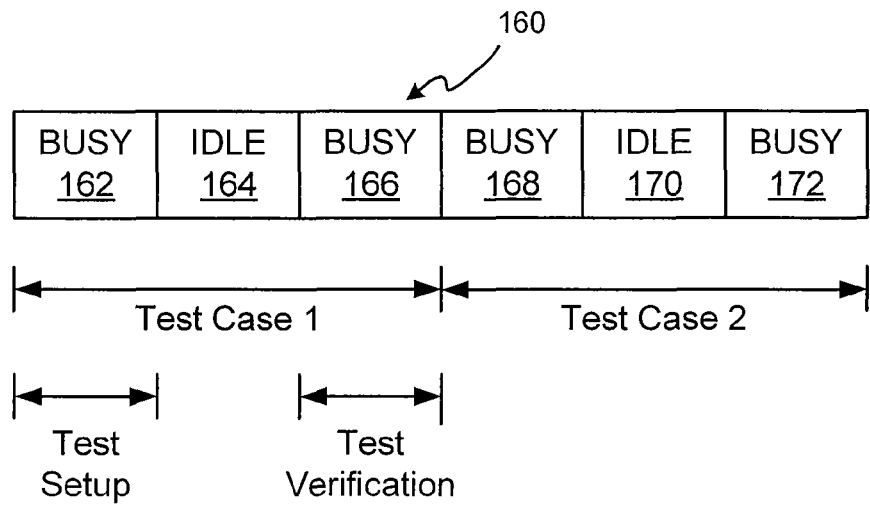
FIG. 5 depicts typical control command bus activity during test case execution.

FIG. 5 depicts typical activity 160 on the control command bus during test case execution. When a first test case is executed, the control command bus is busy during period 162 while commands are sent to the design to set up the functional mode of operation to be tested. Then, during period 164, while the design performs the specified operation, the control command bus is idle. Finally, the control command bus is busy during period 166 while commands are issued to the design to read back the test results. The next test case generally utilizes the control command bus in a similar fashion, as shown for test case 2, with busy periods 168, 172 separated by an idle period 170.

During idle control command bus periods 164, 170, the priority scheduler 128 typically issues any atomic instructions queued up in the noise instruction streamer queue. In one exemplary embodiment, the noise instruction streamer 120 queues noise instructions at random times. Thus, atomic noise instructions can be applied on the control command bus at random times as determined by when the noise instruction streamer 120 queues up a noise instruction. The noise instructions are typically executed during the idle periods on the control command bus that occur during test execution such as periods 164, 170 of test cases 1 and 2.

For example, a test case may specify that the program instruction streamer send a first program sequence to initialize the device and instruct it to perform a certain operation. While the device performs the specified operation, the noise instruction streamer can randomly queue up noise commands that are issued during control command bus idle periods by the priority scheduler. Such operation is useful in simulating control command bus activity directed to another device sharing the control command bus. This mode enables the test bench to test the DUT's sensitivity to commands issued to another device (at a different address space) that should be ignored. When the device has finished the requested operation, the program instruction streamer is instructed to send a second instruction sequence to read device status registers to verify success or failure of the specified operation.

The instruction translator translates individual high level atomic instructions into low level register read/write commands executed by the register abstraction layer (RAL). The RAL may be a SystemVerilog application package. Such a package may be used to automate the creation of a high-level abstraction layer for memory-mapped registers and memories in a device. The RAL may also maintain a mirror copy of the device's register values that is updated when a register read/write access of the device is performed.

In one embodiment, the RAL includes generic read and write functions that are invoked to send register access instructions to the control bus master BFM module. When a write type AI is issued from the IAL, the write function is invoked. In addition to performing a register write to the DUT, the corresponding register in the mirror is updated with the write data value. When a read type AI is issued to the RAL from the IAL, the DUT or the slave BFM provides the data value to the master BFM module. The generic read function is then invoked to compare the value read with an expected register value stored in the mirror. At the end of a test case simulation, if all the expected values match the values read, the test bench indicates that the DUT passed the test case. When a value read does not match the expected value from the mirror, the test bench reports a DUT failure.

Figure 6:
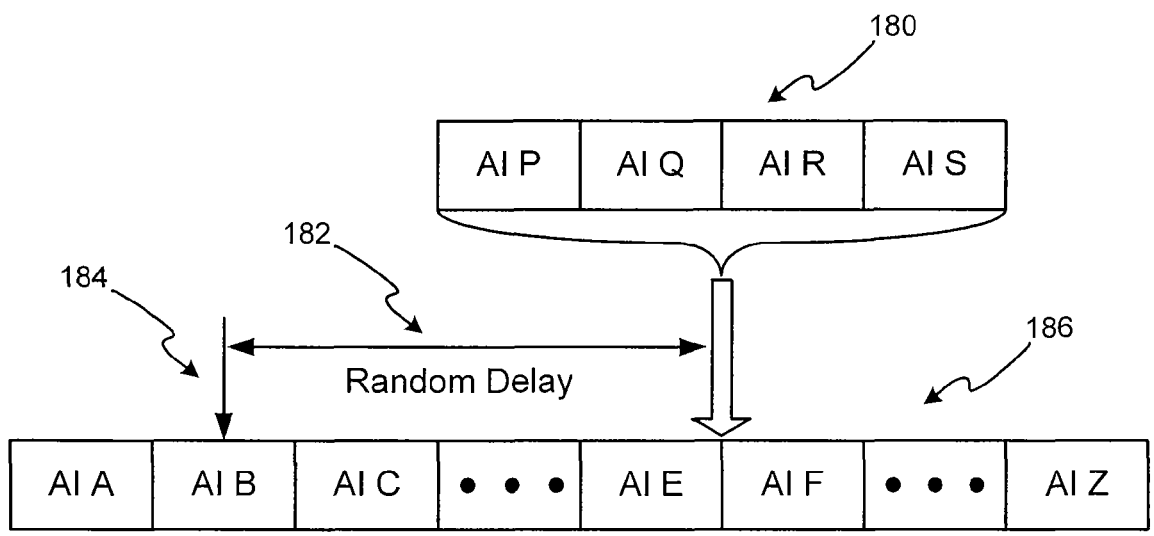
FIG. 6 depicts an interrupt service routine sequence of instructions generated by an interrupt service instruction streamer that is randomly inserted into a program sequence of instructions by a priority scheduler.

The interrupt service instruction streamer 124 may be programmed to queue up an ISR instruction sequence 180 after a random delay 182 from when an interrupt 184 occurs during execution of a program instruction sequence 186, as depicted in FIG. 6. The test manager instructs the interrupt service instruction streamer to queue up the ISR instruction sequence 180 in response to an interrupt 184. The interrupt service instruction streamer, upon seeing the interrupt 184, queues up the ISR instruction sequence AI P, AI Q, AI R, AI S in its queue after a random delay. This allows the interrupt handler instruction sequence 180 to be randomly inserted after a random delay 182 into the program instruction stream 186 queued up by the program streamer 122. That is, the interrupt may occur during execution of instruction AI B of the program instruction sequence 186. After a random delay, the interrupt service instruction streamer queues up instructions AI P, AI Q, AI R and AI S. This delay results in the priority scheduler applying the ISR instruction sequence to the DUT after instruction AI E completes rather than immediately after completion of instruction AI B (resulting in the random delay 182). Because the amount of delay is random, the ISR instruction sequence may be applied to the DUT after completion of any of the atomic instructions AI B, AI C ... AI E, AI F ... AI Z of the program instruction sequence. This allows the test bench to simulate processing of an interrupt that can occur at any time while the program instruction sequence is being executed by the priority scheduler.

Figure 7:
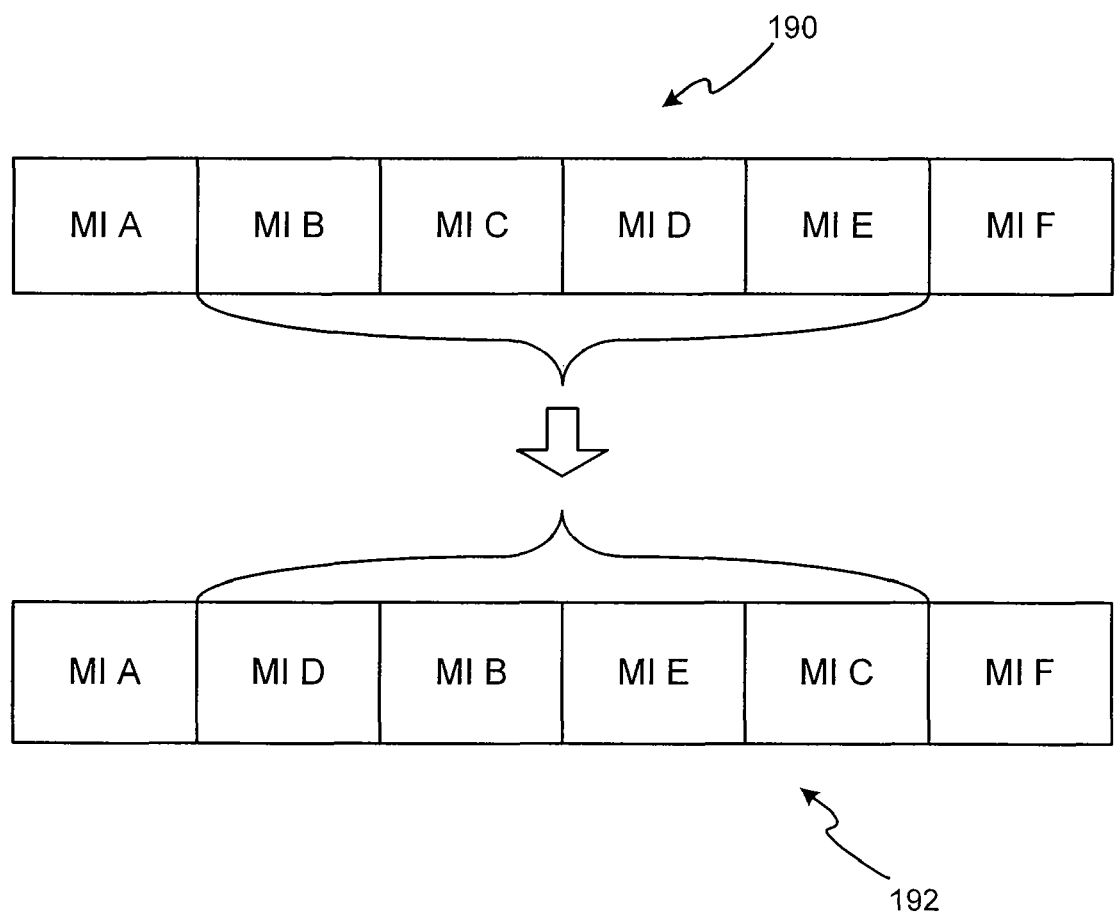
FIG. 7 depicts randomization of a program instruction sequence by a program instruction streamer to generate a randomized program instruction sequence.

In one embodiment, the program instruction streamer 122 may include a queue that is used to create a randomized program instruction sequence for the test case selected by the test generator. The program instruction sequence 190, as depicted in FIG. 7, may be randomized by the program streamer as follows. The program instruction sequence 190 has several instructions MI B, MI C, MI D, MI E that are order independent and therefore can be randomized. Instruction MI A is the first instruction of the sequence and MI F is the last instruction of the sequence. Initially, the non-order dependent instructions MI B, MI C, MI D and MI E of the instruction sequence are randomly inserted into the queue. Then, the last instruction of the test case, MI F, is appended to the end of the queue. Finally, the first instruction of the test case, MI A, is prepended at the front of the queue, resulting in the randomized program instruction sequence 192. The program streamer may then translate each MI into one or more corresponding AIs.

The test manager generally keeps track of synchronization events that occur during execution of a test case. That is, the test manager generally knows when the design has performed a requested operation so that the program instruction streamer can be instructed to queue up the program instruction stream necessary to read the internal registers of the DUT to verify whether or not the DUT successfully performed the requested operation.

Figure 8:
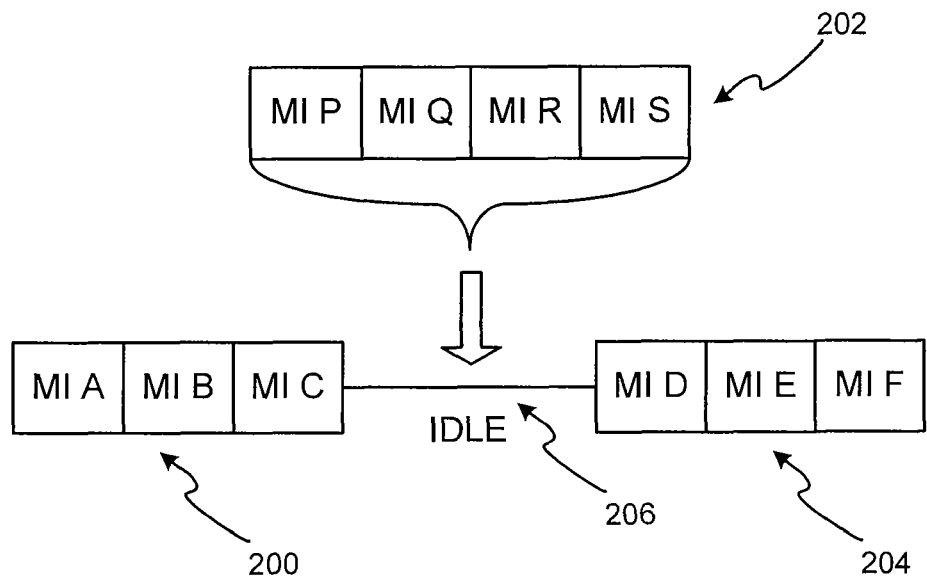
FIG. 8 depicts random noise instructions queued up by a noise instruction streamer for random insertion on the control command bus during idle periods while a program instruction sequence is executed during a design simulation.

The noise instruction streamer may be employed to queue up random noise instructions at random times during a DUT simulation as depicted in FIG. 8. The priority scheduler may apply a sequence of program streamer instructions 200 to the DUT, for example, a program instruction sequence that initializes, configures and tells the DUT to perform a specified task. Then, while the DUT is executing the specified task (perhaps reading a block of data, performing a transform on the block of data and storing the transformed block of data), the noise instruction streamer may queue up one or more random command instructions 202 that lie outside the address space of the DUT on the command bus during an idle period 206 on the control command bus (i.e., the control command bus is not transferring commands to the DUT). During the control command bus idle period, the priority scheduler transfers a noise command from the noise instruction streamer queue and sends it to the instruction translator for execution. Finally, the test generator instructs the program instruction streamer to queue up another program instruction sequence 204 to be sent to read the internal registers of the DUT. The random command instructions not addressed to the DUT test DUT sensitivity to instruction sequences issued to another device sharing the control command bus. Such instructions should be ignored by the DUT. The noise instruction streamer may be programmed to queue up random noise instructions on a specified time interval such as every 20 ms such that noise instructions are sent to the DUT at random times during idle control command bus periods.

Figure 9:
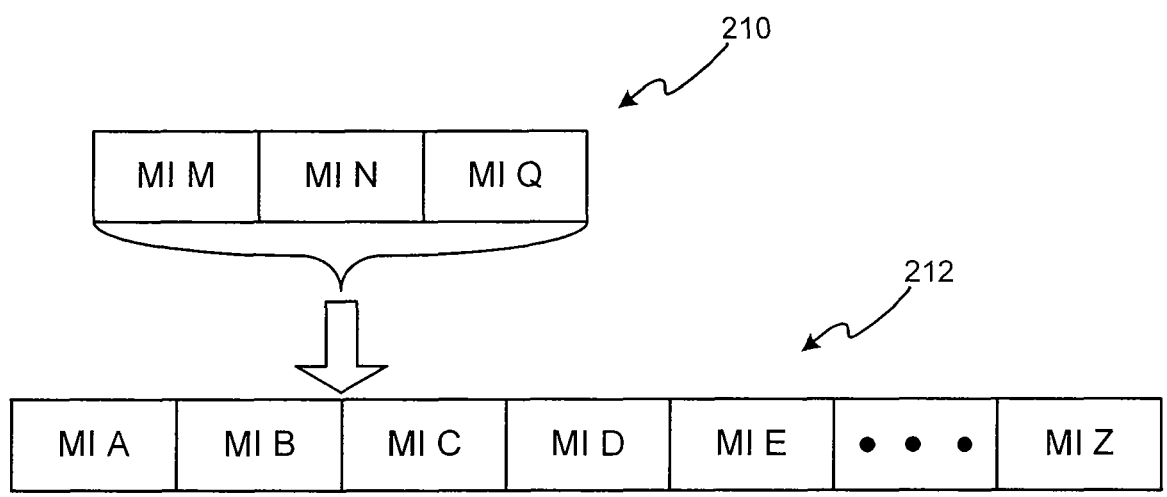
FIG. 9 depicts a custom instruction sequence inserted into a program instruction sequence immediately after the priority scheduler finishes execution of the current program instruction.

One exemplary embodiment may employ a custom instruction streamer that is assigned the highest priority by the priority scheduler. This provides the capability to queue up a custom instruction sequence 210 of one or more instructions that are immediately issued by the priority scheduler upon completion of the current instruction MI B, of a regular program instruction sequence 212, being executed by the priority scheduler during a design simulation as depicted by FIG. 9. For example, a failure may be observed in the lab when a particular instruction sequence 210 is sent in the middle of a data transfer. To determine if this is the cause of the observed failure, the custom instruction streamer may be used to queue up the instruction sequence MI M, MI N, MI Q for immediate execution after the current instruction MI B finishes execution during the simulation. It should be noted that the instruction sequence 210 can be inserted after any of the instructions of the program instruction sequence 212. The custom instruction streamer may also be used to queue up a random MI that is immediately executed by the priority scheduler during a program instruction sequence to test the DUT's sensitivity to order independent instructions.

In one exemplary embodiment, the streamers may be connected to the priority scheduler via input channels. The priority scheduler may select one of the input channels based on the priority order established for the streamers and transfer one instruction from the selected channel to the instruction translator via an output channel. In one particular embodiment, input channel 0 may have the highest priority, input channel 1 the second highest priority, input channel 2 the third highest priority and input channel 3 may have the lowest priority. In other embodiments, channel priority may be based on a round robin or time domain multiplex type priority algorithm.

When input channel 0 is assigned the highest priority, an instruction sequence queued and waiting on input channel 0 results in the priority scheduler immediately transferring an instruction from channel 0 to the instruction translator, regardless of which other input channels have an instruction sequence queued up awaiting execution. After all the instructions awaiting execution from input channel 0 have been executed, the priority scheduler checks input channel 1 (having the second highest priority) for a pending instructions. If channel 1 has pending instructions, the instructions are transferred, one instruction at a time by the priority scheduler, to the instruction translator for execution. If no instructions are pending on input channels 0 and 1, the priority scheduler checks to see if input channel 2 (having the third highest priority) has pending instructions and transfers any pending instructions for input channel 2 to the instruction translator for execution, one instruction at a time. Finally, input channel 3 (having the lowest priority) is checked by the priority scheduler for any pending instructions awaiting execution. These instructions are transferred, one instruction at a time, by the priority scheduler to the instruction translator when no other input channel queue has pending instructions.

For example, the instruction translator may be executing an instruction sequence from input channel 2. Input channel 0 and input channel 1 may then queue up pending instruction sequences. The priority scheduler waits for the current instruction from input channel 2 to finish executing, then immediately switches to input channel 0, transfers instructions, one at a time to the instruction translator until the queue for the input channel 0 is empty, then, switches to input channel 1 and transfers instructions, one at a time to the instruction translator until the channel 1 queue is empty, and then switches back to input channel 2 to continue transferring instructions, one at a time, to the instruction translator from the channel 2 queue until it is empty. Other embodiments may employ a priority scheduler with more or fewer input channels.

The architecture of the priority scheduler allows the IAL to mimic a variety of control bus activities. For example, while the priority scheduler may be transferring a program instruction streamer sequence of instructions to the instruction translator for execution, should an interrupt occur, the priority scheduler may automatically switch to the interrupt service instruction streamer input channel causing the instruction translator to execute the ISR instruction stream in the middle of the program instruction sequence. Once the interrupt service instruction stream has been executed, the priority scheduler may switch back to the program instruction streamer and continue execution of the program instruction stream from the point at which it was interrupted, simulating the behavior of an asynchronous interrupt handler.

Figure 10:
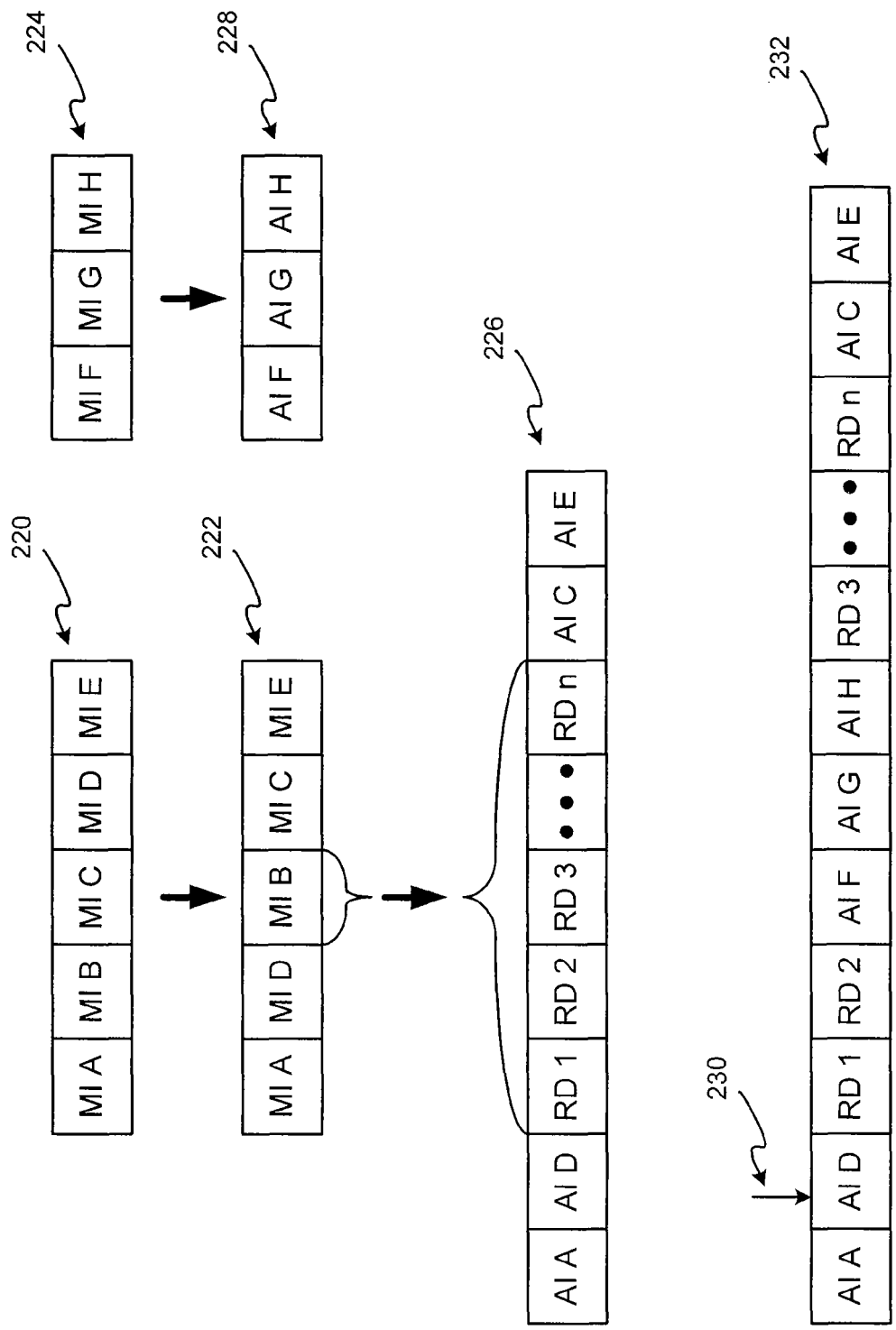
FIG. 10 depicts an instruction flow for a test case as it moves through the test bench.

FIG. 10 depicts an instruction flow for a particular test case as it moves through the test bench. Initially, the test manager determines which instruction streamers will be used to execute the test case. For the particular test case depicted in FIG. 10, the program instruction streamer and the interrupt service instruction streamer are used. The test manager instructs the program instruction streamer to generate the appropriate MI program instruction sequence 220. When the randomize option is specified, the program instruction streamer randomizes the instruction sequence to produce the randomized program instruction sequence 222. Note that when the randomize option is specified, the program streamer randomizes the MI sequence, based on a specified constraint, to create the randomized MI sequence 222. The interrupt service instruction steamer is instructed to generate an ISR instruction sequence 224. The MI instruction sequences 222 and 224 are translated into corresponding AI instruction sequences 226, 228, respectively, by the instruction streamers.

For example, the macro instruction B (MI B) may be a polling instruction, which typically consists of hundreds of atomic register read instructions (RD1 to RDn). The macro instructions A, C, D and E may be simple register read or write instructions (that is, each of these MIs has a one-to-one correspondence with a corresponding AI). Once the MIs have been translated into one or more corresponding AIs, the program instruction streamer may queue the entire AI sequence for execution by the priority scheduler. In one embodiment, the AI sequence may be stored in a queue that is monitored by the priority scheduler. The priority scheduler transfers each AI, one at a time, to the instruction translator for lower level execution. The instruction translator generally completes execution of the AI before the priority scheduler selects another AI and transfers it to the instruction translator for execution.

As depicted in FIG. 10, the interrupt service instruction streamer detects the occurrence of an interrupt 230 during execution of instruction AI D. The interrupt service instruction streamer queues up ISR instruction sequence 228 after a random delay resulting in the ISR instruction sequence 228 being queued up while atomic instruction RD2 of the atomic program instruction sequence 226 is being executed. If the interrupt service instruction streamer has a higher priority than the program instruction streamer, the priority scheduler will transfer the AI F, AI G and AI H instructions to the instruction translator immediately after the current AI RD 2 instruction finishes execution. Once the ISR instruction sequence 228 has been executed, the priority scheduler resumes execution of the pending program instruction streamer instructions RD 3, . . . , RD n, AI C and AI E. This results in a combined instruction sequence 232 that is transferred by the priority scheduler to the instruction translator.

Although the present invention has been described with respect to particular embodiments and methods of operation, it should be understood that changes to the described embodiments and/or methods may be made and yet still embraced by alternative embodiments of the invention. For example, certain embodiments may utilize a variety of instruction streamers that operate in conjunction with a priority scheduler and instruction translator. Other embodiments may combine operations or omit certain operations to the methods and processes disclosed herein. Accordingly, the proper scope of the present invention is defined by the claims herein.

What is claimed is:

1. A constrained random test bench for verifying an integrated circuit design, comprising:
    an instruction streamer configured to:
        hold an instruction sequence for verifying a particular mode of operation of an integrated circuit design, wherein the instruction sequence has a corresponding first priority; and
        detect an interrupt condition and queue an interrupt service routine instruction sequence a random time after detecting the interrupt condition, wherein the interrupt service routine instruction sequence has a corresponding second priority;
    a priority scheduler in communication with the instruction streamer, the priority scheduler operable to:
        issue the instruction sequence when the first priority is higher than the second priority; and
        issue the interrupt service routine instruction sequence when the second priority is higher than the first priority;
        wherein the instruction sequence and the interrupt service routine instruction sequence are each issued one instruction at a time; and
    an instruction translator in communication with the priority scheduler, the instruction translator configured to receive the issued instruction and apply it to the integrated circuit design to perform a requested operation, wherein an expected data value associated with the requested operation is stored in a particular register of a mirror memory; and
    wherein the instruction streamer is further configured to hold a second instruction sequence to:
        read a register of the integrated circuit design to retrieve a register data value, wherein the register of the integrated circuit design corresponds to the particular register of the mirror memory;
        compare expected data value to the register data value;
        provide an indication that the requested operation is a success when the expected data value matches the register data value; and
        provide an indication that the requested operation is a failure when the expected data value does not match the register data value.

2. The constrained random test bench of claim 1, further comprising a test manager in communication with the instruction streamer, the test manager operable to start and stop the instruction streamer.

3. The constrained random test bench of claim 1, wherein the instruction streamer is a noise instruction streamer operable to randomly issue an instruction that lies outside the address space of a chip design.

4. The constrained random test bench of claim 1, wherein the instruction streamer is a customized instruction streamer operable to issue a valid randomized instruction sequence at a specified time during a simulation.

5. The constrained random test bench of claim 1, wherein the instruction streamer is a program instruction streamer operable to issue a valid randomized instruction sequence based, at least in part, on a constraint.

6. The constrained random test bench of claim 5, wherein the constraint specifies an order of an order dependent instruction.

7. The constrained random test bench of claim 1, wherein the priority scheduler is further configured to select an instruction from the instruction streamer based on a priority and issue the instruction to the instruction translator.

8. The constrained random test bench of claim 1, wherein the instruction translator is further configured to translate the instruction into a sequence of one or more low level hardware commands.

9. The constrained random test bench of claim 1, wherein the instruction streamer comprises a plurality of instruction streamers, each having a particular priority level and wherein the priority scheduler selects an instruction from an instruction streamer based on a priority level.

10. A method for performing a constrained random test during a verification of a chip design, comprising:
    receiving an indication of a test to apply to a chip design, the test being executed at a test bench, and the test bench comprising a processor to execute one or more executable components;
    storing an expected data value associated with the test in a particular register of a mirror memory;
    constructing a plurality of instruction sequences to implement the test at a test case generator executing on the test bench;
    executing a first instruction from a first instruction sequence of the plurality of instruction sequences at an instruction translator executing on the test bench, the first instruction having a first priority;
    detecting an interrupt condition and queuing a second instruction sequence of the plurality of instruction sequences a random time after detecting the interrupt condition at an instruction streamer executing on the test bench, the second instruction sequence comprising an interrupt service routine instruction sequence and having a second priority;
    determining that the second priority of the second instruction sequence is higher than the first priority of the first instruction sequence at a priority scheduler executing on the test bench;
    executing the interrupt service routine instruction sequence after the first instruction completes at the instruction translator executing on the test bench;

reading a register of the chip design to retrieve a register data value, wherein the register of the integrated circuit design corresponds to the particular register of the mirror memory;

comparing the expected data value to the register data value;

providing an indication that the requested operation is a success when the expected data value matches the register data value; and providing an indication that the requested operation is a failure when the expected data value does not match the register data value.

11. The method of claim 10 wherein the first instruction sequence is a randomized instruction sequence.

12. The method of claim 10, further comprising executing a third instruction sequence of instructions that lie outside the address space of a chip design under test when there are no higher priority instruction sequences awaiting execution.

13. The method of claim 10, wherein the indication further comprises a valid sequence of one or more instructions and a constraint condition.

14. A method for performing a constrained random test during a verification of a chip design, comprising:

receiving an indication of a test to be executed at a test bench, the test bench comprising a processor to execute one or more executable components;

storing an expected data value associated with the test in a particular register of a mirror memory;

constructing a plurality of instruction sequences, each instruction sequence including one or more instructions at a test case generator executing on the test bench, wherein each of the one or more instructions is an atomic instruction;

issuing each instruction sequence to a corresponding one of a plurality of instruction queues at a priority scheduler executing on the test bench;

executing a first atomic instruction from a first instruction queue of the plurality of instruction queues at an instruction translator executing on the test bench;

translating the first atomic instruction into a low level hardware command at the instruction translator;

determining that a second instruction queue of the plurality of instruction queues having a higher priority than the first instruction queue has a second instruction sequence awaiting execution at a priority scheduler executing on the test bench;

executing one or more second atomic instructions included in the second instruction sequence after the first atomic instruction completes at the instruction translator executing on the test bench;

translating the one or more second atomic instructions into one or more second low level hardware commands at the instruction translator;

reading a register of the chip design to retrieve a register data value, wherein the register of the integrated circuit design corresponds to the particular register of the mirror memory;

comparing the expected data value to the register data value;

providing an indication that the requested operation is a success when the expected data value matches the register data value; and providing an indication that the requested operation is a failure when the expected data value does not match the register data value.

15. The method of claim 14, further comprising randomizing the instruction sequence prior to issuance of the sequence to the corresponding instruction queue.

16. The method of claim 15, wherein the randomization is based, at least in part on a constraint.

17. The method of claim 16, wherein the constraint specifies an order of an order dependent instruction.

\* \* \* \* \*